(12) United States Patent
Russert et al.

(10) Patent No.: US 7,457,499 B2
(45) Date of Patent: Nov. 25, 2008

(54) APPARATUS AND METHOD FOR PRODUCING AN END OF AN OPTICAL FIBER BUNDLE AND IMPROVED OPTICAL FIBER BUNDLE MADE WITH SAME

(75) Inventors: Hubertus Russert, Heidenrod (DE); Thomas Heinrich, Steinbach (DE)

(73) Assignee: Schott AG, Mainz (DE)

( * ) Notice: Subject to any disclaimer, the term of this patent is extended or adjusted under 35 U.S.C. 154(b) by 49 days.

(21) Appl. No.: 11/143,900

(22) Filed: Jun. 2, 2005

(65) Prior Publication Data
US 2005/0276554 A1 Dec. 15, 2005

(30) Foreign Application Priority Data
Jun. 12, 2004 (DE) .................. 10 2004 028 310

(51) Int. Cl.
*G02B 6/04* (2006.01)
*C03B 37/15* (2006.01)

(52) U.S. Cl. .................. 385/115; 385/81; 385/102; 65/402; 65/409; 29/518

(58) Field of Classification Search .................. 385/81, 385/102, 115; 65/402, 409; 29/518
See application file for complete search history.

(56) References Cited

U.S. PATENT DOCUMENTS

| | | |
|---|---|---|
| 3,914,015 A | 10/1975 | Mc Cartney |
| 3,922,098 A | 11/1975 | Katz |
| 4,217,084 A | 8/1980 | Bertau et al. |
| 4,567,650 A | 2/1986 | Balyasny et al. |
| 5,222,180 A | 6/1993 | Kuder et al. |
| 5,787,572 A | 8/1998 | Toms et al. |
| 6,349,572 B1 * | 2/2002 | Meinl et al. .................. 65/410 |

FOREIGN PATENT DOCUMENTS

| | | |
|---|---|---|
| DE | 22 60 065 | 6/1974 |
| DE | 26 30 730 | 1/1977 |
| DE | 32 07 923 C2 | 9/1983 |
| DE | 32 47 500 A1 | 7/1984 |
| DE | 37 44 367 C1 | 8/1989 |
| DE | 695 11 842 T2 | 3/2000 |
| DE | 198 55 958 A1 | 6/2000 |
| EP | 0 727 274 A1 | 8/1996 |
| GB | 1 595 163 | 8/1981 |
| GB | 2 191 873 | 12/1987 |
| JP | 03144601 A | 6/1991 |

* cited by examiner

*Primary Examiner*—Kevin S Wood
*Assistant Examiner*—Jerry Rahll
(74) *Attorney, Agent, or Firm*—Michael J. Striker

(57) ABSTRACT

A method and apparatus are described, which permit a simple, rapid manufacture of an end of an optical fiber bundle. According to the method a metallic sleeve is placed on an end section of the bundle, the end section with the sleeve on it is positioned in a shaping tool without pressing the sleeve and then pressure is exerted on the sleeve exclusively in a radial direction by press jaws of the shaping tool. In the optical fiber bundle made by the method the outer optical fibers (4') of the optical fiber bundle (1) are embedded at least partially in the sleeve material. The apparatus for making the end of the bundle (1) with the sleeve (10) has a shaping tool (20) including at least two radially movable press jaws (22a-22f) that substantially surround the sleeve (10).

10 Claims, 3 Drawing Sheets

APPARATUS AND METHOD FOR PRODUCING AN END OF AN OPTICAL FIBER BUNDLE AND IMPROVED OPTICAL FIBER BUNDLE MADE WITH SAME

BACKGROUND OF THE INVENTION

1. Field of the Invention

The present invention relates to a method of making or producing an end of an optical fiber bundle, in which a sleeve is placed or mounted onto an end section of the optical fiber bundle and the sleeve is pressed in a shaping tool at least while exerting pressure on the end section. The present invention also relates to an apparatus for making or producing the end of the optical fiber bundle with the sleeve, which comprises a holder for holding the end section of the optical fiber bundle and a shaping or pressing tool, in which the sleeve can be pressed against the end section of the optical fiber bundle.

2. Related Art

Frequently a flexible light guide comprising a plurality of individual optical fibers, a so-called optical fiber bundle, is used for light transmission. The individual optical fibers are usually fastened together in a common end in a sleeve, which, for example, is fixed to a light source serving for illumination.

It is known to bond the individual optical fibers with each other by adhesive and with a sleeve that is pushed on them or alternatively by melting the individual optical fibers together in the common sleeve.

JP 3144601 describes a method, with which the end of an optical fiber bundle can be provided. For this purpose the optical fiber bundle end is heated and inserted into a narrowing or constricting opening. The diameter of the bundle is reduced in that way and the bundle is compressed together.

DE 2 630 730 A1 describes a method that begins in the same manner. In this method the end of the optical fiber bundle is similarly inserted into a metallic sleeve. The fiber optic bundle together with the sleeve is then pushed into a narrowing or constricting hole, which is provided in a pressing member. The end of the optical fiber bundle is shaped by means of the sleeve by moving the end of the fiber optic bundle equipped with the sleeve in an axial direction while simultaneously heating.

DE 19 855 958 A1 similarly provides a method in which the terminal region of an optical fiber bundle is equipped with a metallic sleeve and subsequently held in a clamping apparatus. A shaping tool with a decreasing or narrowing inner diameter moves in an axial direction on the sleeve and converts the fiber ends into a hexagonally packed arrangement by heat transfer. There is a gap between the inner wall of the shaping tool and the sleeve, in which the heat transfer to the ends of the optical fibers occurs by means of an annular section at the front end of the optical fiber bundle. The conversion process is conducted so that no glass seal is formed between the optical fiber bundle and the metallic sleeve.

This process has the disadvantage that an axial force must be exerted on the optical fiber bundle when it is inserted in the sleeve, which can lead to damage at least to the outer optical fibers of the bundle. Furthermore the sleeve must be suitable stable so that a material like steel must be selected for it or a large wall thickness is required.

In the methods described in DE 32 47 500 A1 and DE 37 44 367 C1 melted glass is injected around a glass fiber bundle arranged in a sleeve by means of an annular injecting means. The apparatuses performing these methods are comparatively expensive.

According to GB 1 595 163 a thermoplastic terminal sleeve is bonded to the thermoplastic protective jacket of the optical fiber bundle by ultrasonic welding using a two part sonotrode and to the optical fiber bundle.

U.S. Pat. No. 3,914,015 describes a fiber binder. The end sleeve inserted in this fiber binder comprises a shrinkable metal, which is shrunk onto the fiber ends at a temperature of about 75° C.

U.S. Pat. No. 5,222,180 describes a process for making a terminating member for a fiber bundle made from polymer fibers. The fibers are drawn cold, inserted in a sleeve and then heated. During heating they attempt to regain their original shape and fill the sleeve cross-section.

SUMMARY OF THE INVENTION

It is an object of the present invention to provide a method, which permits rapid manufacture of an end of an optical fiber bundle in a simple manner.

It is a further object of the present invention to provide an apparatus for performing the method for making the end of the optical fiber bundle, which includes a shaping or pressing tool.

It is also an object of the present invention to provide an improved optical fiber bundle of optical fibers made of glass, which has a sleeve on an end section of the bundle that has a clearly stronger seat on the optical fiber bundle than in similar optical fiber bundles of the prior art.

The method of making or producing an end of an optical fiber bundle comprises the steps of:

a) placing or mounting a sleeve on an end section of the optical fiber bundle, the optical fiber bundle comprising a plurality of optical fibers made of glass;

b) inserting and positioning the end section of the optical fiber bundle with the sleeve placed on the end section in a pressing tool without pressing on the sleeve, said pressing tool having more than two heated press jaws; and c) after the inserting and positioning of step b), exerting pressure on the sleeve exclusively in a radial direction by means of the press jaws.

The pressing process is simultaneously applied to the entire outer surface of the sleeve to be pressed. In contrast to an axial insertion of the pressing tool and a pressing process proceeding in the axial direction, as in the case of the prior art, substantial time is saved. The pressing times were reduced from the minute range to the second range.

An additional advantage is that the outer optical fibers of the bundle are exposed to scarcely any axial load so that damage to these optical fibers is avoided. Since the bending of the sleeve during processing because of axial forces is no longer feared, the sleeve material no longer needs to have the stability required in the prior art. The sleeve can be made from a ductile material with reduced wall thickness.

Also deep-drawn sleeves of reasonably priced material, e.g. brass, can be used in the method according to the invention, in contrast to the sleeves, which are usually machined or milled in the methods of the prior art.

Deep-drawn sleeves may be made with clearly reduced outer diameters than the milled parts so that optical fiber bundles with outer diameters in the range of a few mm can also be provided with a terminal sleeve.

Since thin-walled sleeves can be used due to the missing axial load and the resulting optical fiber bundle can have smaller dimensions, new areas of application have thus been opened up for the optical fiber bundle. The end of the optical fiber bundle can be integrated in current plug connections of standard dimensions. Thus the end of the optical fiber bundle can be used for plugs according to the MOST standard, which are used in automobile applications. Also simpler sleeve geometries are usable, for example sleeves without annular collars, since the sleeve does not need to be fixed in the axial direction.

Preferably the optical fibers of the end section are not pressed together during insertion in the sleeve. The fibers are of course held fixed, but are not in a press fit. An axial load on the optical fibers is avoided when the sleeve is put on them.

The sleeve is preferably heated to 500° C. to 700° C., especially 550° C. to 650° C., during the making of the end of an optical fiber bundle, in which the optical fibers are made from glass and a metallic sleeve is used.

The pressing times are clearly shortened because the heating occurs at the same time over the entire outer surface of the sleeve to be shaped.

The optical fiber bundle made by the method is characterized in that the outer optical fibers of the bundle are at least partially embedded in the material of the sleeve.

Preferably the sleeve comprises a ductile material. Because of that the material of the sleeve is deformable during the working-in process, the outer optical fibers can be pressed into the material of the sleeve, whereby the optical fibers are interconnected with the sleeve material. A clearly more stable connection between the optical fibers and the sleeve is obtained, which is observable in larger pull-out forces.

In order to make this embedding possible during the method the sleeve material must be softer and more plastic than the optical fibers. The sleeve preferably comprises metal, especially brass, or glass.

The sleeve preferably has a wall thickness of 0.3 to 0.4 mm. This wall thickness is especially necessary with smaller outer diameters, which are in a range of greater than or equal to 0.5 mm. The preferred outer diameter of the sleeve can be 0.5 to 25 mm. A large range of optical fiber bundle diameters is thus covered.

In the simplest embodiment the sleeve can be cylindrical and comprises only one pipe section.

Preferably only one section of the sleeve is pressed.

It is advantageous when the sleeve has a larger diameter sleeve section and a smaller diameter sleeve section prior to pressing, because the larger diameter section can act as an aid for insertion of the optical fiber bundle end.

The apparatus for making an end of the optical fiber bundle with a sleeve has a shaping tool with more than two press jaws surrounding the sleeve that are movable in a radial direction in order to guarantee as complete a coverage on all sides of the sleeve as possible. Preferably the shaping tool has six press jaws.

The term "radial direction" herein means a direction perpendicular to the longitudinal axis of the sleeve.

Preferably a counter ring is provided, on which the press jaws engage, wherein preferably the outer surface of the press jaws taken together bears on the inner surface of the counter ring, and the counter ring and the press jaws are movable in an axial direction relative to each other.

The "axial direction" herein means the direction of the longitudinal axis of the sleeve, which is the same as the longitudinal axis of the shaping tool. The press jaws are movable inwardly in a radial direction during the motion of the counter ring in relation to the press jaws.

The counter ring can have a conical interior surface, which slides over the front edges of the press jaws or over the outer surface of the press jaws.

Preferably each press jaw has a section narrowing or tapering to its free end.

The outer surface of all press jaws taken together can be in the shape of a truncated pyramid or cone. Because of that a sliding surface, over which the interior surface of the counter ring can slide, is formed on the press jaws.

In order to make the sliding easier and/or to reduce the wear of the parts, the inner surface of the counter ring and/or the outer surface of the press jaws can be provided with a heat-resistant sliding coating, especially comprising titanium or aluminum nitride.

Preferably the press jaws are spring-loaded or spring-biased in a radial direction. It is of advantage when the press jaws are movable inwardly in a radial direction against a spring force acting outwardly in the radial direction or radially. The press jaws move back into their open position after the pressing process because of the spring force that acts to move them outwardly.

Preferably the shaping tool comprises a pipe-shaped body, which has an end section provided with longitudinal slots or slits. The press jaws comprise the pipe segments separated by the longitudinal slits or slots. The pipe segments are arranged spring-loaded in this way in the pipe-shaped body.

The shaping tool has at least one heating unit. The heating unit can comprise an induction heater, heating strip and/or heating cartridge. Because of the high temperatures, which are required in pressing of the metallic sleeve, it is necessary that the shaping tool comprise a heat-resistant material.

In a preferred embodiment of the apparatus each press jaw is equipped with its own heating cartridge.

The apparatus comprises a holder for holding the end section of the optical fiber bundle.

Preferably the holder is movable in an axial direction. This movability is especially advantageous when the wear on the counter ring and/or the outer surface of the press jaws has proceeded so far that the axial movement of the parts must be increased. Also tolerances of the sleeve dimensions and dimensions of the optical fiber bundle end can be compensated by a larger shift between the counter ring and the pressing tool. An axially movable and if necessary spring-loaded positioning of the holder of the optical fiber bundle increases the axial forces so that damage to the optical fibers can be effectively avoided.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERED EMBODIMENTS

Figure 1:
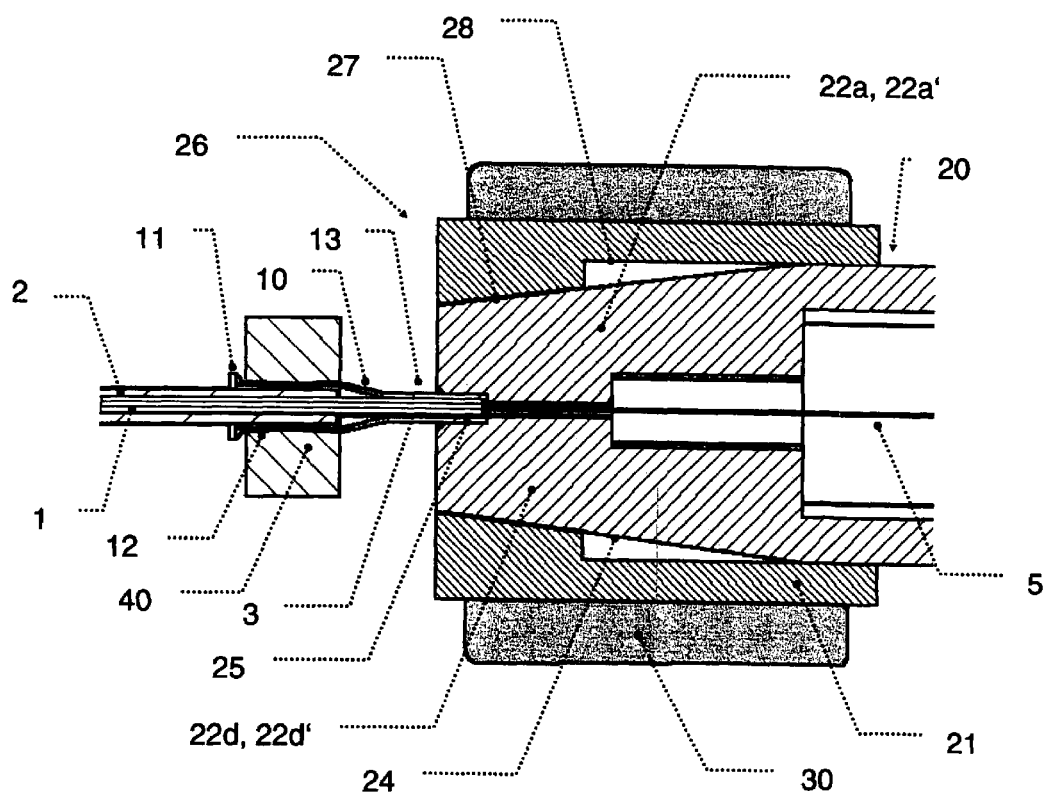
FIG. 1 is a cross-sectional view through an apparatus for making an end of an optical fiber bundle according to the invention.

An apparatus for making an end of an optical fiber bundle is shown in FIG. 1. An optical fiber bundle 1 with a protective sheathing 2 is shown on the left side of FIG. 1. This optical fiber bundle 1 has an end section 3, which is free of the protective sheathing 2. A sleeve 10 is pushed over this end section 3 and the end section of the protective sheathing 2. The sleeve 10 has a larger diameter section 12 and a smaller diameter section 13. A collar 11, which however has no significance for the inventive method and also can be omitted, is formed on the rear end of the larger diameter section 12. The sleeve 10 is held in the vicinity of the larger diameter section 12 by a holder 40, which is slidable in the axial direction, i.e. in the direction of the longitudinal axis 5, and is spring-loaded (not shown).

Figure 2:
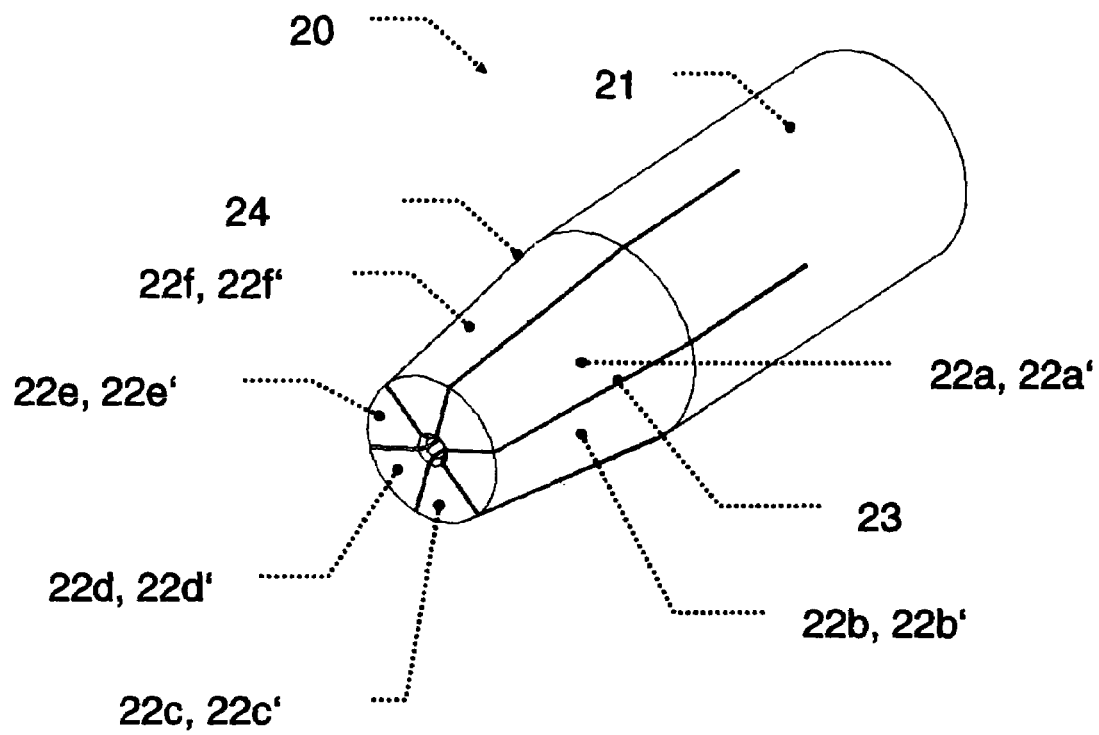
FIG. 2 is a perspective view of a shaping or pressing tool.

The front part 25 of the smaller diameter section 13 of the sleeve 10, which is to be pressed, is inserted in a shaping tool 20, which has a pipe-shaped body 21, which has several press jaws 22a to 22f, as shown in FIG. 2.

The pipe-shaped body 21 is—as shown in FIG. 2—provided with a total of six longitudinal slots or slits 23 distributed over its circumference, whereby six pipe segments or press jaws 22a to 22f are formed, which have tapering sections 22a' to 22f' on their free ends. The press jaws 22a to 22f are arranged spring-loaded in the pipe-shaped body 21 and can move in a radial direction. The press jaws 22a-22f taken together in the region of the tapering sections 22a' to 22f' have a truncated cone-shaped or conical outer contour, wherein the conical outer surface 24 cooperates with a counter ring 26 shown in FIG. 1.

The counter ring 26 likewise has a conical inner surface 27, which slides over the outer surface 24 of the press jaws 22a to 22f during axial motion of the counter ring 26 over the shaping tool 20. The contacting surfaces of the counter ring 26 and the press jaws 22a to 22f can be provided with a lubricating coating.

The counter ring 26 has a cylindrical section with a cylindrical interior surface 28, which assists in the axial guiding of the shaping tool 20. The press jaws are moved in a radial direction (see arrow) by the axial motion of the counter ring 16 over the shaping tool 20, whereby the sleeve 10 is pressed on the optical fiber bundle end 3.

The apparatus is provided with a heating mantel 30 in the embodiment shown in FIG. 1, which bears on the outer side of the counter ring 26.

Figure 3:
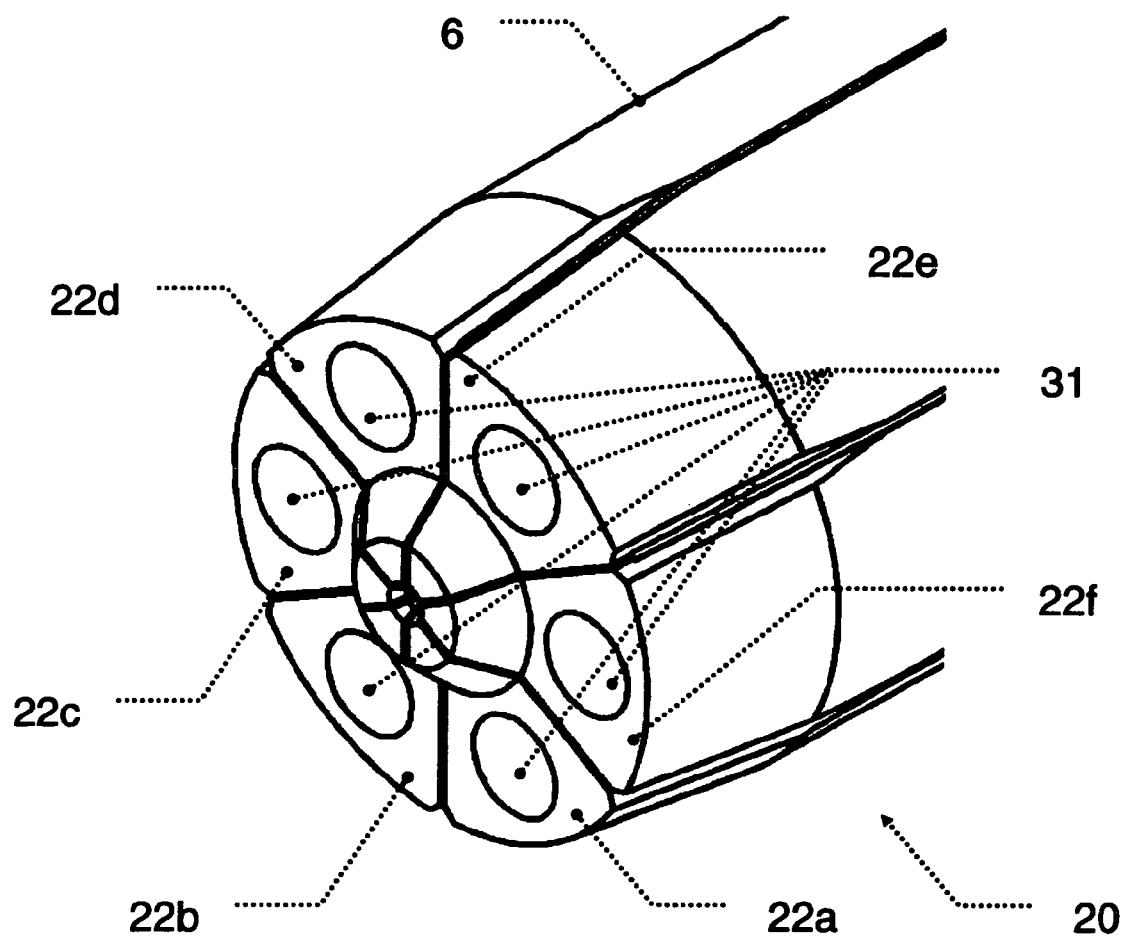
FIG. 3 is a detailed perspective view of a front end of another embodiment of a shaping or pressing tool used in the apparatus according to the invention.

In FIG. 3 a front view of another embodiment of the shaping tool 20 is shown. In this embodiment each press jaw 22a to 22f has its own heating cartridge 31.

Figure 4:
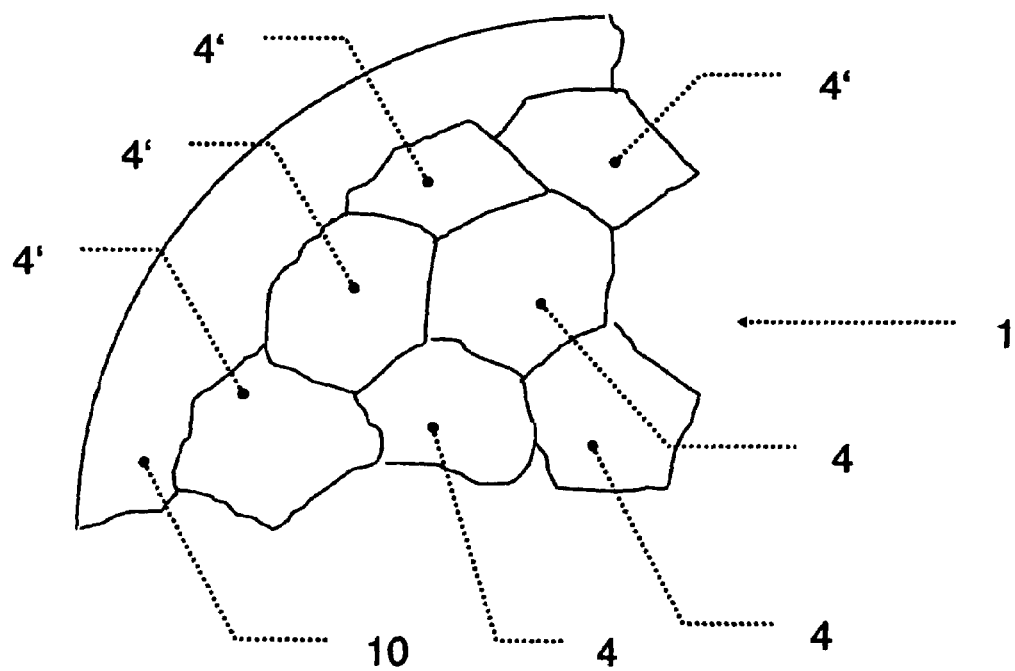
FIG. 4 is a cutaway front plan view of a portion of the front surface of the optical fiber bundle with the pressed-on sleeve.

A detailed perspective view of the front end of a optical fiber bundle 1 with a sleeve 10 is shown in FIG. 4. A shaping of the inner surface of the sleeve 10 occurs due to the pressing of the sleeve 10 on the optical fibers 4, so that the outer optical fibers 4' are pressed into the material of the sleeve 10 and are partially embedded in the material of the sleeve 10. Because of that a stable connection between the outer optical fibers 4' and the sleeve material is guaranteed, whereby the pull-out force is considerably increased. The optical fibers 4, 4' are deformed in this pressing process, in which no melting of the optical fibers 4 occurs. However the optical fibers adhere in the sleeve and to each other in all cases.

The disclosure in German Patent Application 10 2004 028 310.9-51 of Jun. 12, 2004 is incorporated here by reference. This German Patent Application describes the invention described and claimed in the appended claims and provides basis for a claim of priority for the instant invention under 35 U.S.C. 119.

While the invention has been illustrated and described as embodied in a method and apparatus for making an end of an optical fiber bundle and an improved optical fiber bundle made with same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed in the following appended claims is new.

PARTS LIST 1 optical fiber bundle
2 protective sheathing
3 end section
4 optical fiber
4' outer optical fiber
5 longitudinal axis
10 sleeve
11 collar
12 larger diameter section
13 smaller diameter section
20 shaping tool
21 pipe-shaped body
22a-22f press jaws
22a'-22f' tapering section
23 longitudinal slot or slit
24 conical outer surface
25 front or pressed part
26 counter ring
27 conical inner surface
28 cylindrical inner surface
30 heating jacket
31 heating cartridge
40 holder

We claim:

1. A method for producing the end of an optical fiber bundle, said method comprising the steps of:
   a) placing a sleeve on an end section of an optical fiber bundle, said optical fiber bundle comprising glass fibers;
   b) inserting and positioning the end section of the optical fiber bundle with the sleeve placed on the end section in a pressing tool without pressing on the sleeve, said pressing tool having more than two heated press jaws; and
   c) after the inserting and positioning of step b), exerting pressure on the sleeve exclusively in a radial direction by means of the press jaws.

2. The method as defined in claim 1, wherein the optical fibers of the end section are not pressed against each other when the sleeve is placed or mounted on the end section.

3. The method as defined in claim 1, wherein the sleeve comprises a ductile metal.

4. The method as defined in claim 3, wherein the ductile metal is brass.

5. The method as defined in claim 1, wherein the sleeve is heated to a temperature of 500° C. to 700° C.

6. The method as defined in claim 1, wherein the pressing occurs until formation of a pinch-free end of the optical fiber bundle.

7. An optical fiber bundle (1) having at least one end section (3) and a metallic sleeve (10) attached to said at least one end section, said metallic sleeve (10) being made of a sleeve material;
   wherein the optical fiber bundle (1) comprises a plurality of optical fibers (4,4') made of glass and the optical fibers of the bundle include outer optical fibers (4') at least partially embedded in the sleeve material of the metallic sleeve (10).

8. The optical fiber bundle as defined in claim 7, wherein said metallic sleeve comprises a ductile metal.

9. The optical fiber bundle as defined in claim 8, wherein the ductile metal is brass.

10. The optical fiber bundle as defined in claim 7, wherein the metallic sleeve (10) has a wall thickness of 0.3 to 0.4 mm.

* * * * *